US012570305B2

(12) United States Patent (10) Patent No.: US 12,570,305 B2
Ham (45) Date of Patent: Mar. 10, 2026

(54) DRIVING INFORMATION DISPLAY APPARATUS AND METHOD

(71) Applicants:Hyundai Motor Company, Seoul (KR); Kia Corporation, Seoul (KR)

(72) Inventor: Jeong Hun Ham, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 127 days.

(21) Appl. No.: 18/475,446

(22) Filed: Sep. 27, 2023

(65) Prior Publication Data

US 2024/0391483 A1     Nov. 28, 2024

(30) Foreign Application Priority Data

May 22, 2023     (KR) ......................... 10-2023-0065682

(51) Int. Cl.
  B60W 50/14        (2020.01)
  B60W 40/02        (2006.01)
      (Continued)

(52) U.S. Cl.
  CPC ............ B60W 50/14 (2013.01); B60W 40/02 (2013.01); B60W 40/105 (2013.01); G06V 20/58 (2022.01); G06V 20/588 (2022.01); G06V 20/64 (2022.01); B60W 2050/0083 (2013.01); B60W 2050/146 (2013.01); B60W 2420/403 (2013.01); B60W 2420/54 (2013.01); B60W 2540/106 (2013.01);
      (Continued)

(58) Field of Classification Search
  CPC .... B60W 50/14; B60W 40/02; B60W 40/105;

B60W 2050/0083; B60W 2050/146; B60W 2420/403; B60W 2420/54; B60W 2540/106; B60W 2540/12; B60W 2540/21; B60W 2540/225; B60W 2552/53; B60W 2554/402; B60W 2554/4041; B60W 2554/80; B60W 2555/60; G06V 20/58; G06V 20/588; G06V 20/64

See application file for complete search history.

(56) References Cited

U.S. PATENT DOCUMENTS 8,676,431 B1 *  3/2014  Mariet ................. G08G 1/0962
                                            701/28
11,458,841 B2 *  10/2022  Higashiyama ......... B60K 35/28
      (Continued)

*Primary Examiner* — Mohamed Barakat
(74) *Attorney, Agent, or Firm* — Slater Matsil, LLP

(57)        ABSTRACT

An embodiment driving information display apparatus includes a collection device configured to collect image information about surroundings of a vehicle including a side rear of the vehicle through cameras and to collect distance information about the surroundings of the vehicle through distance sensors, a determination device configured to identify objects included in the image information, to determine object information for each identified object based on the image information and the distance information, and to determine whether the object information satisfies a warning condition, and a display device installed inside the vehicle and configured to display at least a portion of the object information along with the image information and to output a warning notification in response to a determination that the object information satisfies the warning condition, wherein the at least the portion of the object information is displayed to correspond to the object in the image information.

20 Claims, 6 Drawing Sheets

(51) Int. Cl.
  B60W 40/105 (2012.01)
  G06V 20/56 (2022.01)
  G06V 20/58 (2022.01)
  G06V 20/64 (2022.01)
  B60W 50/00 (2006.01)

(52) U.S. Cl.
  CPC ..... *B60W 2540/12* (2013.01); *B60W 2540/21* (2020.02); *B60W 2540/225* (2020.02); *B60W 2552/53* (2020.02); *B60W 2554/402* (2020.02); *B60W 2554/4041* (2020.02); *B60W 2554/80* (2020.02); *B60W 2555/60* (2020.02)

(56) References Cited

U.S. PATENT DOCUMENTS

| | | | |
|---|---|---|---|
| 2016/0110618 A1* | 4/2016 | Oba ..................... | G06V 20/597 |
| | | | 348/148 |
| 2017/0061219 A1* | 3/2017 | Shin ..................... | G06V 10/811 |
| 2017/0174262 A1* | 6/2017 | Kobayashi ............ | B60W 50/14 |
| 2018/0222424 A1* | 8/2018 | Kodama ............ | B60R 21/0134 |
| 2019/0114489 A1* | 4/2019 | Jackson ................. | G06V 10/82 |
| 2021/0162927 A1* | 6/2021 | Takii ........................ | B60Q 1/50 |

\* cited by examiner

FIG. 1 driving information
display apparatus
*(100)* collection unit
*(110)* determination unit
*(120)* display unit
*(130)*

21 speed : 98km/h
relative speed : +17km/h
reach my vehicle's
position in 1.5 seconds position of pedestrian
from vehicle : 5m
speed : 3km/h
estimated time
to collision : 4.5s

DRIVING INFORMATION DISPLAY APPARATUS AND METHOD

CROSS-REFERENCE TO RELATED APPLICATIONS

This application claims the benefit of Korean Patent Application No. 10-2023-0065682, filed on May 22, 2023, which application is hereby incorporated herein by reference.

TECHNICAL FIELD

The present disclosure relates to a driving information display apparatus and method.

BACKGROUND

Side mirrors are devices that provide a view of the surroundings of a vehicle for drivers who have difficulty securing a view of the surroundings of the vehicle while driving so that the drivers can recognize the situation around the vehicle. Side mirrors are applied to most vehicles to prevent accidents.

The conventional side mirrors generally provide drivers with a view of the surroundings of the vehicle through a physical reflective mirror, but in recent years, with the advancement of electronic device technology, a device has been developed that replaces the conventional physical reflective mirrors and provides drivers with a view of the surroundings of the vehicle through image information collected through cameras.

Examples of the device that provides drivers with a view of the surroundings of a vehicle through cameras are a digital side mirror (DSM), a surround view monitor (SVM), and the like. Compared with the existing side mirrors, these devices can provide a wider and clearer view of the surroundings and stably provide a view of the surroundings even in rainy conditions.

On the other hand, these devices not only provide a better view but also are used to simply provide a view of the surroundings like the conventional side mirrors or to simply display a warning based on the detection of approaching objects in the vicinity, regardless of the information displayed on an image screen.

Therefore, there is a need to propose measures that allow more effective utilization of the devices that provide drivers with a view of the surroundings through cameras to assist the drivers in driving.

The matters described above as background technology are intended to provide a better understanding of the background of embodiments of the present disclosure and should not be considered as acknowledging that the present disclosure pertains to the prior art already known to those skilled in the art.

SUMMARY

The present disclosure relates to a driving information display apparatus and method. Particular embodiments relate to a driving information display apparatus and method for displaying information about the surroundings of a vehicle on an image screen of a display unit provided in the vehicle.

An embodiment of the present disclosure effectively conveys information about the surroundings of a vehicle determined through various sensors to drivers in conjunction with a digital image screen depicting the surroundings of the vehicle.

The embodiments of the present disclosure are not limited to the embodiment mentioned above, and other embodiments not mentioned will be clearly understood by those skilled in the art from the following description.

According to an embodiment of the present disclosure, a driving information display apparatus includes a collection unit collecting image information about the surrounding of a vehicle including at least the side rear of the vehicle through cameras and collecting distance information about the surroundings of the vehicle through distance sensors, a determination unit identifying objects included in the image information, determining the object information for each identified object based on the image information and the distance information, and determining whether the object information satisfies a warning condition, and a display unit installed inside the vehicle to display at least a portion of the object information along with the image information and output a warning notification when the object information satisfies the warning condition, in which at least a portion of the object information is displayed to correspond to the object in the image information.

For example, the object information may include at least one of the speed, acceleration, traveling direction, relative position to the vehicle, coordinates, and type of the object in the image information.

For example, the warning condition may be determined based on the comparison result between at least one of the speed and acceleration of the object in the object information and preset reference values.

For example, the warning condition may be determined based on the coordinates of the object in the image information in the object information.

For example, the determination unit may recognize a lane line between the vehicle and the object in the image information, and the warning condition may be satisfied when the coordinates of the object in the image information overlap the recognized lane line.

For example, the warning condition may be determined based on the rate of change of the coordinates of the object in the image information.

For example, the warning condition may be satisfied when the type of the object is included in a preset type.

For example, the determination unit may determine that the type of the object is included in the preset type when the identified object has preset characteristic information in the image information.

For example, the collection unit may further collect sound information about the surroundings of the vehicle, and the determination unit may determine whether the type of the object is included in the preset type when the sound information satisfies a preset condition.

For example, the warning condition may change according to at least one of the weather information, driving distance information, speed of the vehicle, type of the object, relative location, and user settings.

For example, the determination unit may identify the object by recognizing the profile of the object in the image information.

For example, the determination unit may identify only an object included in a preset area within the image information.

For example, the determination unit may identify the object in each of a plurality of preset areas within the image information, and the warning condition may be set to correspond to each of the plurality of areas.

For example, the plurality of areas may include a first area and a second area corresponding to a vicinity of the vehicle relative to the first area, and the warning condition may be relaxed for the first area relative to the second area.

For example, the warning condition may include at least a first condition and a second condition different from each other, and the display unit may output different warning notifications depending on whether the first condition and the second condition are respectively satisfied.

For example, the outputting of the warning notification may be terminated when a preset lift condition is satisfied.

For example, whether the lift condition is satisfied may be determined based on the user input values.

For example, the user input values may include at least one of the user settings, accelerator pedal depression amount information of the vehicle, brake pedal depression amount information of the vehicle, voice command information, and gaze tracking information.

For example, the determination unit may reset the warning notification condition based on the user input values after the warning is output by the display unit.

A driving information display method according to an embodiment of the present disclosure includes collecting image information about the surroundings of a vehicle including at least the side rear of the vehicle through cameras and collecting distance information about the surroundings of the vehicle through distance sensors, identifying objects included in the image information, determining object information for each identified object based on the image information and the distance information, determining whether the object information satisfies a warning condition, displaying at least a portion of the object information along with the image information through a display unit provided inside the vehicle, and outputting a warning notification through the display unit when the object information satisfies the warning condition, in which at least a portion of the object information is displayed to correspond to the object in the image information.

By the various embodiments of the present disclosure as described above, a driver can conveniently and diversely obtain information necessary for driving so that driving convenience and driving stability are improved.

In particular, information about the surroundings collected through various sensors is visually provided in conjunction with the image screen and warnings are output based thereon so that the driver can more clearly perceive the driving situation.

In addition, by differentiating displayed information for each object appearing on the image screen, information optimized for diverse situations may be provided for the driver's driving.

The effects obtainable from embodiments of the present disclosure are not limited to the effects mentioned above, and other effects not mentioned will be clearly understood by those skilled in the art from the following description.

BRIEF DESCRIPTION OF THE DRAWINGS

FIG. 1 is a view illustrating a configuration of a driving information display apparatus according to an embodiment of the present disclosure.

DETAILED DESCRIPTION OF ILLUSTRATIVE EMBODIMENTS

Figure 2:
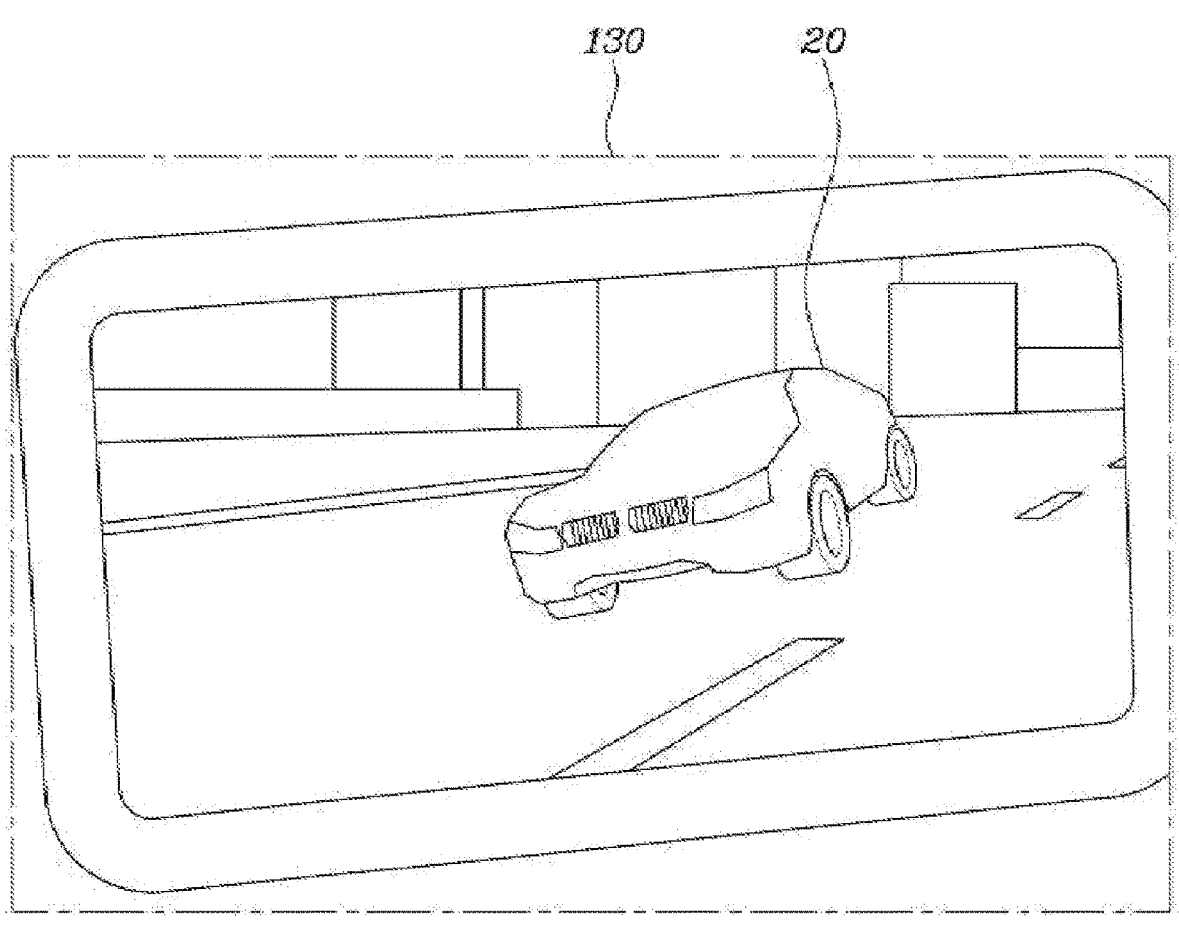
FIG. 2 is a view for describing a method of identifying an object according to an embodiment of the present disclosure.

Specific structural or functional descriptions of the embodiments of the present disclosure disclosed herein are presented only for the purpose of describing embodiments of the present disclosure, and the present disclosure may be implemented as various embodiments, which should not be construed as limited to the embodiments described herein.

Since the embodiments according to the present disclosure may be subjected to various modifications and may assume many forms, specific embodiments will be illustrated in the drawings and described in detail herein. However, this is not intended to limit embodiments according to the concept of the present disclosures to particular disclosure forms and should be understood to include all modifications, equivalents, and substitutes included in the scope of ideas and technology of the present disclosure.

Unless defined otherwise, all terms used herein, including technical or scientific terms, have the same meaning as commonly understood by those with ordinary skill in the art to which the present disclosure pertains. Terms such as those defined in commonly used dictionaries should be construed as having a meaning consistent with the meaning in the context of the related art and are not to be construed as having an ideal or overly formal meaning unless explicitly defined herein.

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the other component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts, or combinations thereof.

In addition, a unit or a control unit included in the names such as a motor control unit (MCU), a hybrid control unit (HCU), and the like is a term widely used in the naming of controllers that control specific functions of a vehicle and does not mean a generic function unit.

A controller may include a communication device that communicates with other controllers or sensors to control the functions for which the controller is responsible, a memory that stores an operating system or logic instructions and input and output information, and one or more processors that perform determinations, calculations, decisions, and the like necessary for controlling the functions for which the controller is responsible.

In one embodiment of the present disclosure, it is proposed to ensure that a driver diversely and effectively perceives the information about the surroundings of the vehicle by displaying the information determined through various sensors in conjunction with an image screen.

Figure 1:
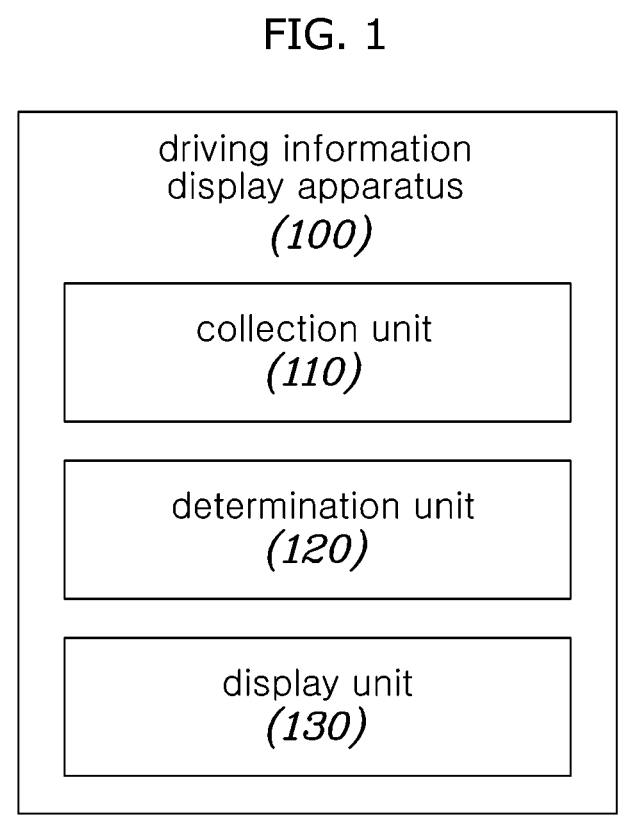

Before describing a driving information display method according to an embodiment of the present disclosure, a driving information display apparatus according to an embodiment of the present disclosure will be first described with reference to FIGS. 1 to 3 below.

Figure 3:
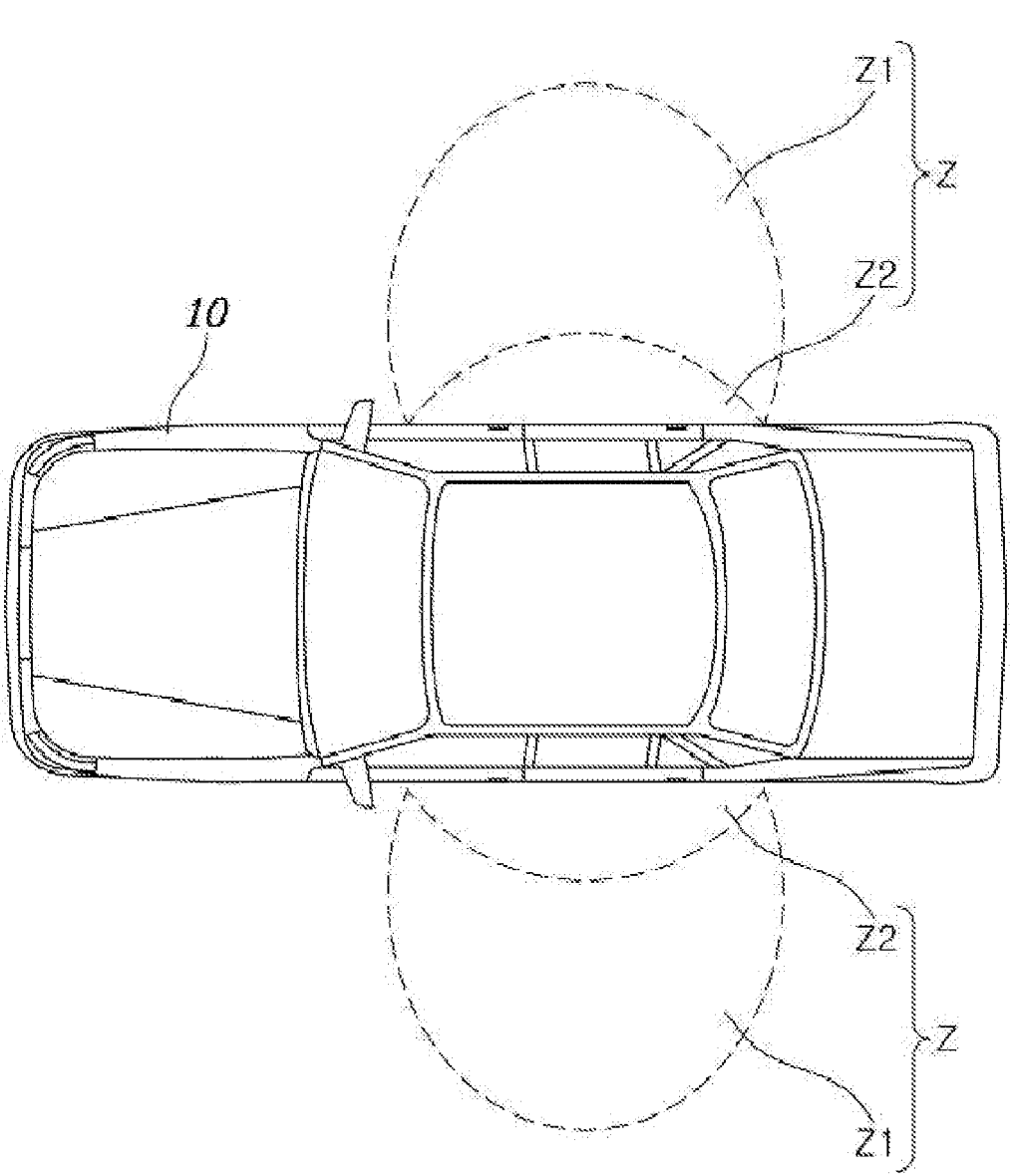
FIG. 3 is a view for describing control of a driving information display apparatus in each area from the vehicle according to an embodiment of the present disclosure.

FIG. 1 is a view illustrating a configuration of a driving information display apparatus according to an embodiment of the present disclosure, FIG. 2 is a view for describing a method of identifying an object according to an embodiment of the present disclosure, and FIG. 3 is a view for describing control of a driving information display apparatus in respective areas from the vehicle according to an embodiment of the present disclosure.

First, FIG. 1 shows that a driving information display apparatus 100 according to an embodiment of the present disclosure includes a collection unit 110, a determination unit 120, and a display unit 130. It goes without saying that FIG. 1 mainly shows the components related to the description of embodiments of the present disclosure and that the actual driving information display apparatus 100 may include more or fewer components than this. Each component of the driving information display apparatus 100 will be described in detail below.

The collection unit 110 collects image information about the surroundings of a vehicle 10 including at least the side rear of the vehicle 10 through cameras and collects distance information about the surrounding of the vehicle 10 through distance sensors.

In this case, the cameras may include cameras photographing the side rear of the vehicle 10, a camera photographing the front of the vehicle 10, and a camera photographing the rear of the vehicle 10, for example.

Here, the cameras photographing the side rear of the vehicle 10 may be installed near the exterior of the driver and passenger side doors of the vehicle 10, that is, provided in the areas where side mirrors are mounted. Further, the camera photographing the front of the vehicle 10 may be provided on the inner top of the windshield, and the camera photographing the rear of the vehicle 10 may be provided on the side of a rear panel.

On the other hand, in an embodiment, the cameras include all the cameras photographing the side rear, front, and rear of the vehicle 10, but may also be implemented by including only a portion of them. In particular, only cameras photographing the side rear of the vehicle 10 may be provided.

The distance sensors may include sensors, such as radar, LiDAR, or an ultrasonic sensor, that recognize surrounding objects by utilizing the radio waves, lasers, ultrasonic waves, and the like emitted to and then reflected from other objects.

The collection unit 110 may further collect sound information about the surroundings of the vehicle 10. The collected sound information, along with the image information or distance information, may be utilized in determining the object information by the determination unit 120.

The determination unit 120 may identify an object 20 included in the image information collected through the cameras. For example, FIG. 2 shows that the identification of an object 20 may be performed by identifying a profile of the object 20 in the image information. Besides, image classification technology based on deep learning and the like may be used in identifying objects 20. To this end, a processor or a memory may be included in implementing the determination unit 120.

The determination unit 120 may determine the object information for each identified object 20 based on the image information and distance information. In this case, the object information may include at least one of the speed, acceleration, traveling direction, relative position with respect to the vehicle 10, coordinates, and type in the image information of the object 20 and the object information determined for each identified object 20 may be different. The object information may be utilized along with the distance information and image information in the determination, or the determination may be based only on the distance information or only on the image information.

Further, the determination unit 120 may determine whether the object information satisfies a preset warning condition. The warning condition may be set in diverse ways and may apply differently for each identified object 20 or determined object information.

For example, the warning condition may be determined based on a comparison result between at least one of the speed and acceleration of the object 20 in the object information and the preset reference values. In this case, the speed and acceleration of the object 20 may be determined based on the distance information.

Besides, the warning condition may apply to object information determined based on the image information and may be determined based on the coordinates of the object 20 in the image information in the object information, for example. More specifically, the warning condition may be satisfied when the coordinates of the object 20 in the image information overlap the coordinates of the lane line, and to this end, the determination unit 120 may recognize the coordinates of the lane line between the vehicle 10 and the object 20 in the image information.

In addition, the warning condition may be determined based on the rate of change of the coordinates of the object 20 in the image information. More specifically, the warning condition may be determined based on the speed or acceleration of the object 20, but even when the current speed or acceleration of the object 20 does not significantly affect the driving of the vehicle 10, the warning condition may be determined to be satisfied to prevent potential risks if the rate of change is large.

On the other hand, the warning condition may be set such that whether the warning condition is satisfied may depend on the type of the object 20. For example, when the type of the object 20 is included in the preset type, the warning condition may be determined to be satisfied. On the other hand, the type of the object 20 may be determined by the identification of the object 20 by the determination unit 120, and in this case, the image information may be utilized.

More specifically, when the identified object 20 has a characteristic preset in the image information, the determination unit 120 may determine that the type of the object 20 is included in the preset type. In this case, the characteristic information may correspond to the siren light and the like in the image information.

In addition, when the sound information collected by the collection unit 110 satisfies a preset condition, the determination unit 120 may determine whether the type of the object 20 is included in a preset type. For example, when the sound information corresponds to the siren sound of an emergency vehicle (police car, fire engine, ambulance, and the like), the determination unit 120 may determine that the object 20 corresponds to an emergency vehicle.

Further, the warning condition may change according to at least one of the weather information, driving distance information, speed of the vehicle 10, type of the object 20, relative position, and user settings.

For example, weather information may include precipitation, fog, and the like and may be obtained from a server of a weather agency. Driving distance information may include the speed limit on the road, the curvature of the road, and the like and may be obtained in conjunction with a navigation system.

On the other hand, FIG. 3 shows that the determination unit 120 may identify only the object 20 included in a preset area Z within the image information. For example, the determination unit 120 may identify only the object 20 included in an area within a predetermined range from the vehicle 10, and as a result, displaying of unnecessary information or distraction of a driver's attention by the unnecessary warning may be prevented.

Further, the determination unit 120 may identify the object 20 in each of a plurality of preset areas, and the warning condition may be set to correspond to each of the plurality of areas. In this case, the plurality of areas may include a first area Z1 and a second area Z2 corresponding to a vicinity of the vehicle 10 relative to the first area, and the warning condition may be relaxed for the first area Z1 relative to the second area Z2. For example, the warning condition may be set to be satisfied when the speed of the object 20 exceeds 60 km/h in the first zone Z1, while the warning condition may be set to be satisfied when the speed of the object 20 exceeds 70 km/h in the second area Z2.

The display unit 130 is provided inside the vehicle 10 and, for example, may be implemented in a pair on the driver and passenger sides to display the side rear images on both sides of the vehicle. Alternatively, the display unit 130 may be implemented as a cluster, an audio, video, and navigation (AVN) device, and the like. The display unit 130 may display at least a portion of the object information along with the image information, and at least a portion of the object information is displayed to correspond to the object 20 in the image information.

In addition, the display unit 130 may output a warning notification when the object information satisfies a preset warning condition.

On the other hand, the display unit 130 may terminate the outputting of the warning when a preset lift condition is satisfied. In this case, whether the lift condition is satisfied may be determined based on the user input value, and the user input value may include at least one of the user settings, accelerator pedal depression amount information of the vehicle 10, brake pedal depression amount information of the vehicle 10, voice command information, and gaze tracking information. Here, the voice command information may include a driver's command input for the voice command function in the vehicle 10 or a control signal corresponding to the input command, and the gaze tracking information may include a driver's gaze input collected through eye tracking technology.

For example, when a driver steps on the brake pedal after a warning condition is satisfied and a warning notification is output through the display unit 130, the outputting of the warning may be terminated based on the determination that the driver recognizes the warning situation. In addition, when the driver's gaze is tracked after the warning notification is output and the tracked gaze is directed toward the display unit 130, the outputting of the warning notification may be terminated based on the determination that the driver recognizes the warning.

In this case, the determination unit 120 may reset the warning condition based on the user input value input after the warning is output by the display unit 130. For example, when the speed of the object 20 exceeds a preset speed and a warning notification is output by the display unit 130, the warning condition may be relaxed by lowering the preset speed if the brake pedal depression amount rapidly increases after the warning notification so that the warning may be output earlier.

On the other hand, the warning condition may include at least a first condition and a second condition different from each other, and the display unit 130 may output different warnings depending on whether the first condition and the second condition are respectively satisfied. In this case, only the color of the screen border of the display unit 130 may change in the warning mode corresponding to the first condition, and the color of the entire screen of the display unit 130 may change in the warning mode corresponding to the second condition. Further, the warning notification of the display unit 130 may include an audio notification as well as a visual notification, and a warning sound or guidance sound may be output along with a display on the screen.

On the other hand, the display unit 130 may be implemented such that both a visual display and an auditory display, such as a warning sound, of the image information and the object information may be performed together.

Further, according to an embodiment of the present disclosure, the driving information display apparatus 100 may be linked to a control system of the vehicle such as to output control signals to not only display warning notifications but also to modify the behavior of the vehicle 10 itself in an advanced warning mode.

More specific embodiments of the driving information display apparatus 100 will be described with reference to FIGS. 4 and 5 below.

Figure 4:
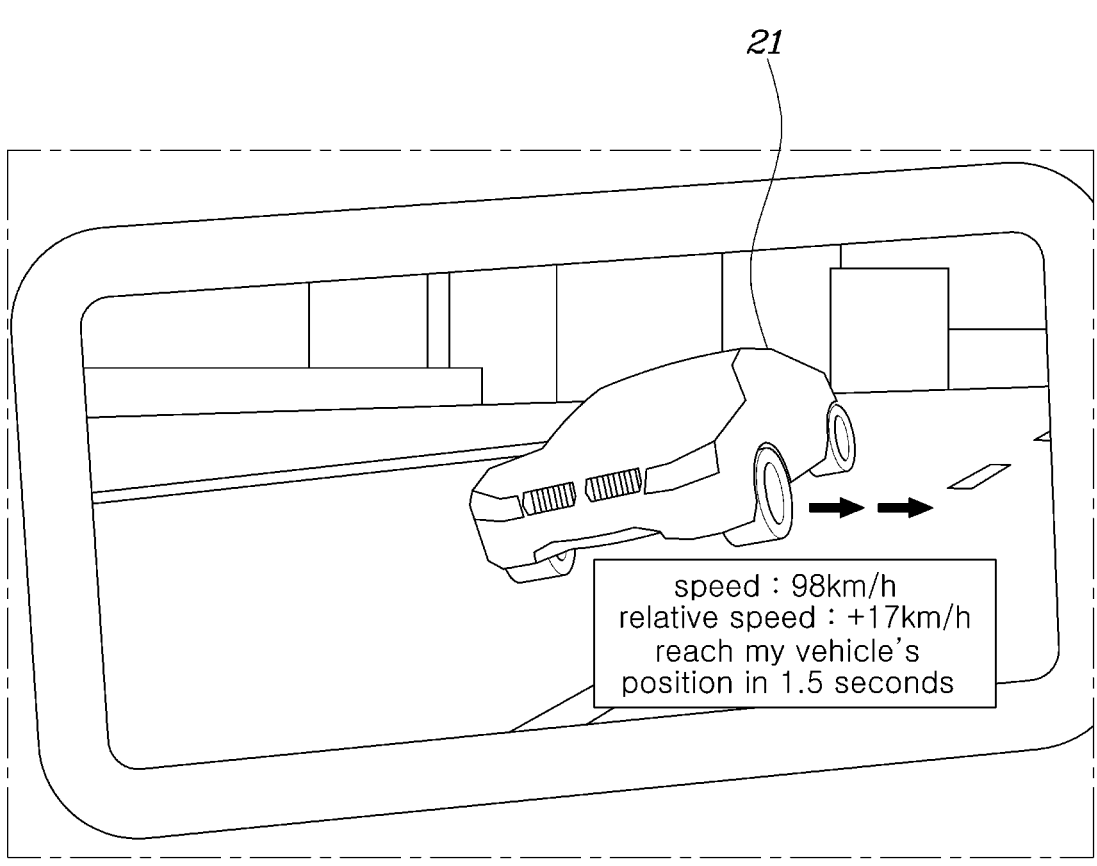
FIG. 4 is a view for describing a case in which a vehicle is identified in a driving information display apparatus according to an embodiment of the present disclosure.

FIG. 4 is a view for describing a case in which a vehicle is identified in the driving information display apparatus according to an embodiment of the present disclosure.

FIG. 4 shows that image information and object information are displayed in the display unit 130 when the object 20 identified in the image information is a nearby vehicle 21.

In this case, the display unit 130 may display object information such as the speed, relative speed with respect to the vehicle 10, estimated time to reach the vehicle 10, and traveling direction of the nearby vehicle 21 in the vicinity of the image of the nearby vehicle 21. Further, an arrow or the like may be added between the object information and the nearby vehicle 21 in the image information to ensure that the driver may more clearly recognize that the object information is regarding the nearby vehicle 21.

On the other hand, the determination unit 120 may determine that the warning condition is satisfied when the speed of the nearby vehicle 21 exceeds a reference value, and in this case, a warning notification may be output through the display unit 130.

In this case, the reference value may change according to driving distance information, weather information, and the speed of the vehicle 10. For example, the reference value may change according to the speed limit or road curvature included in the driving distance information, the speed or acceleration of the vehicle 10, whether the vehicle 10 is being driven at night, the presence of raining or snowing weather included in the weather information, the distance between the vehicle 10 and the nearby vehicle 21, and the like.

In addition, whether the warning condition is satisfied may be determined according to the traveling direction of the nearby vehicle 21. In this case, the determination unit 120 may determine whether the warning condition is satisfied based on the traveling speed of the nearby vehicle 21 in the vehicle width direction or by considering the diagonal movement of the nearby vehicle 21 based on its traveling direction and speed.

In addition, when the nearby vehicle 21 crosses the driving lane line of the vehicle 10, the determination unit 120 may determine that the warning condition is satisfied based on the lane line recognition in the image information regardless of the speed or traveling direction of the nearby vehicle 21. In this case, the lane line recognition in the image information may be performed utilizing the front camera provided in the vehicle 10.

In addition, the determination unit 120 determines the rate of change of the outline of the vehicle 21 identified in the image information and may determine that the warning condition is satisfied when the rate of change of the profile exceeds a predetermined value. In particular, when the nearby vehicle 21 drives in an unusual manner, such as swaying significantly from side to side, a warning notification may be output to prepare the driver for a potentially dangerous situation even if the speed or traveling direction of the nearby vehicle 21 alone poses no threat to the vehicle 10.

Figure 5:
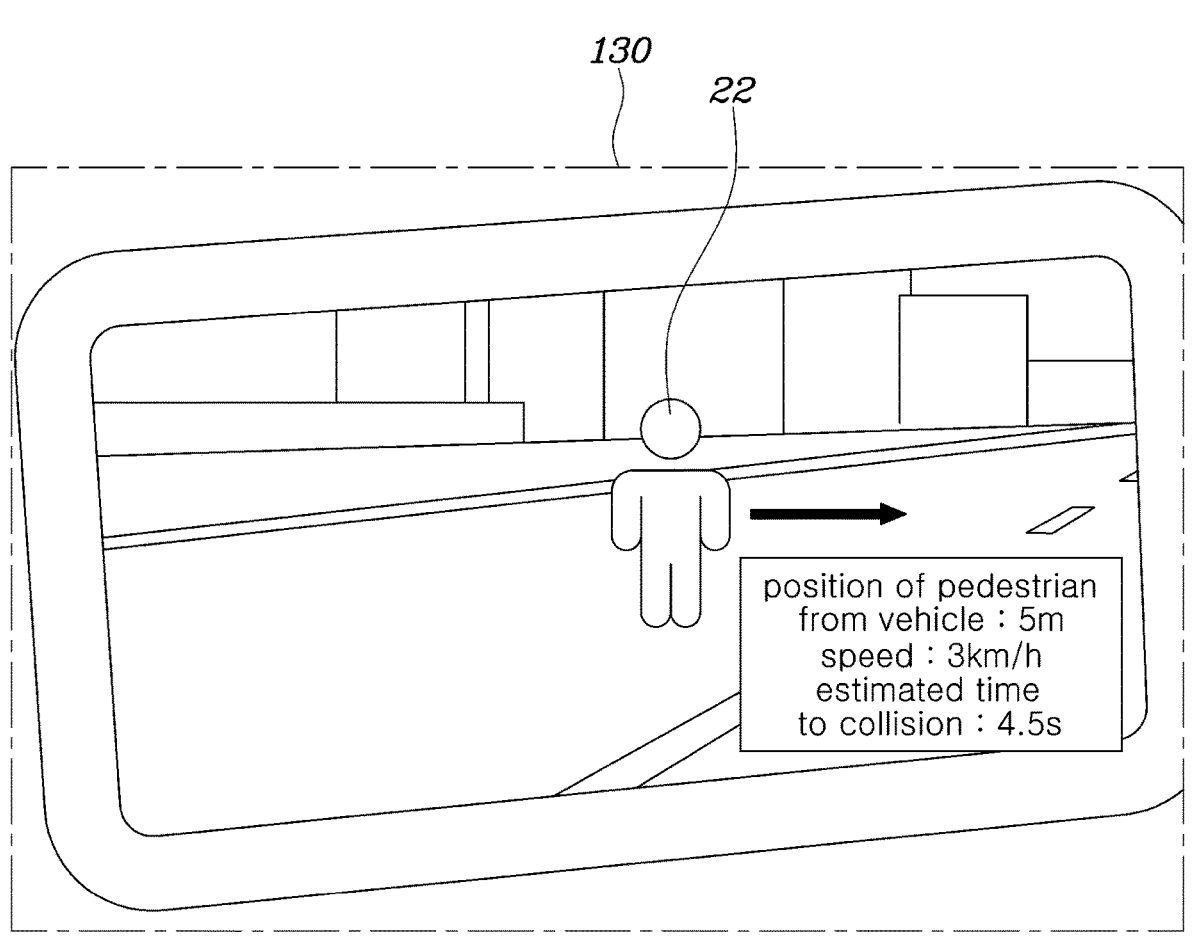
FIG. 5 is a view for describing a case in which an object other than a vehicle is identified in a driving information display apparatus according to an embodiment of the present disclosure.

FIG. 5 is a view for describing a case in which an object other than a vehicle is identified in a driving information display apparatus according to an embodiment of the present disclosure.

FIG. 5 shows that image information and object information are displayed in the display unit 130 when the object 20 identified in the image information is an object 22 other than a vehicle.

Different object information may be displayed in the display unit 130 for each identified object 20. For example, when the identified object 20 is an object 22 other than a vehicle, the display unit 130 may indicate that the information, such as the type of the object 22, the distance from the vehicle 10, the speed and traveling direction of the object 22, and the estimated time to collision, is specifically related to the object 22.

In this case, the determination unit 120 may flexibly apply different warning conditions for each type of object 20. For example, when the type of object 22 includes a pedestrian, a scooter, a bicycle, and the like, different speeds serving as reference values of the warning conditions may apply for the respective types.

In addition, when it comes to a pedestrian, the type of object 22 may be further subdivided into a child, a senior citizen, and the like, and the warning condition may be weighted according to the type of object 22.

Further, when the gaze of the pedestrian identified in the image information is not directed toward the vehicle 10, the determination unit 120 may apply a weighted warning condition.

A driving information display method according to an embodiment of the present disclosure will be described with reference to FIG. 6 based on the above description below.

Figure 6:
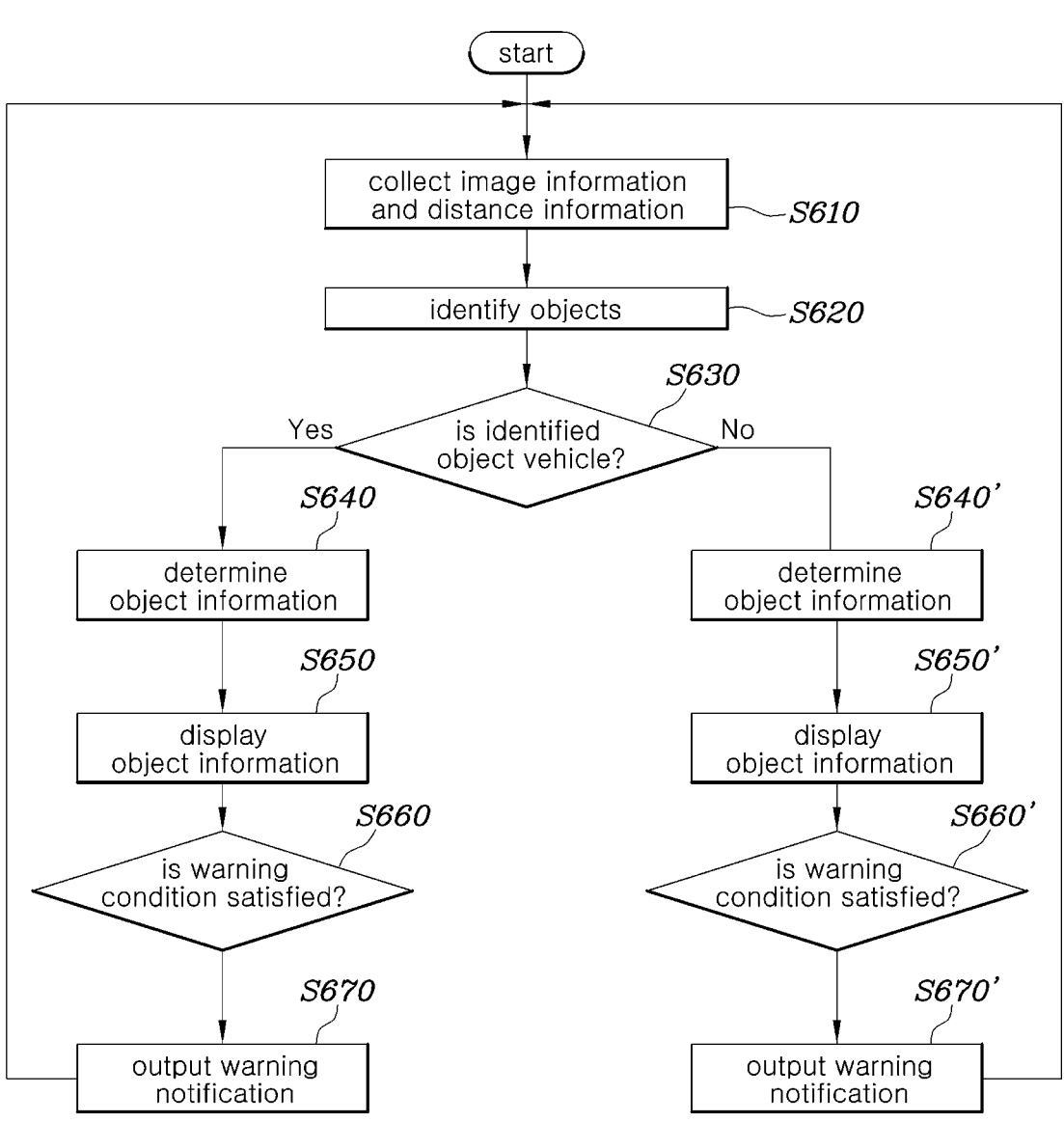
FIG. 6 is a flowchart of a driving information display method according to an embodiment of the present disclosure.

FIG. 6 shows that the collection unit 110 first collects image information and distance information through cameras and distance sensors (S610), and the determination unit 120 then identifies an object 20 based on the collected image information and distance information (S620).

Thereafter, the determination unit 120 determines the object information for each identified object 20 (S630, S640, S640'). In particular, depending on whether the identified object 20 is a vehicle (S630), the object information may be determined differently (S640, S640').

The determined object information is displayed to correspond to the object 20 in the image information in the display unit 130, and in this case, all or a portion of the determined object information may be displayed (S650, S650').

In addition, the determination unit 120 determines whether a warning condition is satisfied based on the determined object information (S660, S660'), and may output a warning notification through the display unit 130 if the warning condition is satisfied (S670, S670'). Here, the embodiments described above may apply to the determination of whether the warning condition is satisfied and a method of outputting a warning notification.

By the various embodiments of the present disclosure described above, a driver can conveniently and diversely obtain information necessary for driving so that driving convenience and driving stability are improved.

In particular, information about the surroundings collected through various sensors is visually provided in conjunction with the image screen, and warnings are output based thereon so that a driver can more clearly recognize the driving situation.

In addition, by differentiating displayed information for each object appearing on the image screen, information optimized for diverse situations may be provided for the driver's driving.

Specific embodiments of the present disclosure have been described in detail, but it will be obvious to those skilled in the art that various modifications and amendments are possible within the scope of the technical spirit of the present disclosure and it is natural that such modifications and amendments belong to the accompanying claims.

What is claimed is:

1. A driving information display apparatus, the apparatus comprising:

a camera configured to capture image information about surroundings of a vehicle including a side rear of the vehicle; and a distance sensor configured to detect distance information about the surroundings of the vehicle;

a controller configured to identify types of objects included in the image information, to determine object information of an object based on the image information and the distance information, wherein the types of objects include a first type including another vehicle and a second type including a human, and wherein the controller is configured to determine different types of the object information based on the identified type of the object; and a display panel installed in the vehicle, the display panel configured to display at least a portion of the object information along with the image information based on a type of object identified, wherein at least the portion of the object information is displayed to correspond to the object in the image information, wherein the controller is configured to further determine whether the object information satisfies a warning condition, and wherein the display panel is configured to output a warning notification in response to a determination that the object information satisfies the warning condition, wherein the object information comprises coordinates of the object, wherein the warning condition is determined based on the coordinates of the object, and wherein the controller is configured to recognize a lane line between the vehicle and the object in the image information, wherein the warning condition is satisfied when the coordinates of the object in the image information overlap the recognized lane line.

2. The apparatus of claim 1, wherein the object information comprises a speed or an acceleration of the object, and wherein the warning condition is determined based on a comparison result between the speed or the acceleration of the object in the object information and preset reference values.

3. The apparatus of claim 1, wherein the warning condition is satisfied when the type of object is included in a preset type.

4. The apparatus of claim 3, wherein the controller is configured to determine that the identified object type is included in the preset type when the identified object type has preset characteristic information in the image information.

5. The apparatus of claim 3, further comprising a collection device configured to collect sound information about the surroundings of the vehicle, wherein the controller is configured to determine whether the type of object is included in the preset type when the sound information satisfies a preset condition.

6. The apparatus of claim 1, wherein the warning condition changes according to weather information, driving distance information, a speed of the vehicle, the type of object, a relative position, or user settings.

7. The apparatus of claim 1, wherein the controller is configured to identify the object by recognizing a profile of the object in the image information.

8. The apparatus of claim 1, wherein the controller is configured to identify only an object included in a preset area within the image information.

9. The apparatus of claim 1, wherein the warning condition comprises a first condition and a second condition different from each other, and wherein the display panel is configured to output different warning notifications depending on whether the first condition and the second condition are respectively satisfied.

10. The apparatus of claim 1, wherein output of the warning notification is terminated when a preset lift condition is satisfied.

11. The apparatus of claim 10, wherein whether the preset lift condition is satisfied is determined based on user input values.

12. The apparatus of claim 11, wherein the user input values comprise user settings, accelerator pedal depression amount information of the vehicle, brake pedal depression amount information of the vehicle, voice command information, or gaze tracking information.

13. The apparatus of claim 1, wherein the controller is configured to reset the warning condition based on user input values input after the warning notification is output by the display panel.

14. A driving information display apparatus, the apparatus comprising:

a camera configured to capture image information about surroundings of a vehicle including a side rear of the vehicle;

a distance sensor configured to detect distance information about the surroundings of the vehicle through distance sensors;

a controller configured to identify objects included in the image information, to determine object information for each identified object based on the image information and the distance information, and to determine whether the object information satisfies a warning condition, wherein the controller is configured to identify the object in each of a plurality of preset areas within the image information and wherein the warning condition is set to correspond to each of the plurality of preset areas; and a display panel installed in the vehicle and configured to display at least a portion of the object information along with the image information and to output a warning notification in response to a determination that the object information satisfies the warning condition, wherein at least the portion of the object information is displayed to correspond to the object in the image information.

15. The apparatus of claim 14, wherein the plurality of preset areas comprises a first area and a second area corresponding to a vicinity of the vehicle relative to the first area, wherein the warning condition is relaxed for the first area relative to the second area.

16. A driving information display apparatus, the apparatus comprising:

a camera configured to capture image information about surroundings of a vehicle including a side rear of the vehicle; and a distance sensor configured to detect distance information about the surroundings of the vehicle;

a controller configured to identify types of objects included in the image information, to determine object information of an object based on the image information and the distance information, wherein the types of objects include a first type including another vehicle and a second type including a human, and wherein the controller is configured to determine different types of the object information based on the identified type of the object; and a display panel installed in the vehicle, the display panel configured to display at least a portion of the object information along with the image information based on a type of object identified, wherein at least the portion of the object information is displayed to correspond to the object in the image information, wherein the controller is configured to further determine whether the object information satisfies a warning condition, and wherein the display panel is configured to output a warning notification in response to a determination that the object information satisfies the warning condition, wherein the object information comprises coordinates of the object and wherein the warning condition is determined based on the coordinates of the object, wherein the warning condition is determined based on a rate of change of the coordinates of the object in the image information.

17. The apparatus of claim 16, wherein the object information comprises a speed of the object, and wherein the warning condition is determined based on a comparison result between the speed of the object in the object information and a preset reference value.

18. The apparatus of claim 16, wherein the object information comprises an acceleration of the object, and wherein the warning condition is determined based on a comparison result between the acceleration of the object in the object information and a preset reference value.

19. The apparatus of claim 16, wherein the warning condition changes according to weather information.

20. The apparatus of claim 16, wherein the warning condition changes according to the type of object.

* * * * *